US012665329B2

(12) United States Patent
Butler et al.

(10) Patent No.: US 12,665,329 B2
(45) Date of Patent: Jun. 23, 2026

(54) USER CONFIGURABLE AUDIO LOUDSPEAKER

(71) Applicant: Dolby Laboratories Licensing Corporation, San Francisco, CA (US)

(72) Inventors: Joel A. Butler, Springfield, MO (US); Jeremy David Sommerfeld, Nixa, MO (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 566 days.

(21) Appl. No.: 18/022,130

(22) PCT Filed: Aug. 19, 2021

(86) PCT No.: PCT/US2021/046747

§ 371 (c)(1),
(2) Date: Feb. 17, 2023

(87) PCT Pub. No.: WO2022/040451

PCT Pub. Date: Feb. 24, 2022

(65) Prior Publication Data

US 2023/0327353 A1 Oct. 12, 2023

Related U.S. Application Data

(60) Provisional application No. 63/067,563, filed on Aug. 19, 2020.

(30) Foreign Application Priority Data

Aug. 19, 2020 (EP) .................................... 20191732

(51) Int. Cl.

| | |
|---|---|
| ***H01R 12/73*** | (2011.01) |
| ***H01R 12/71*** | (2011.01) |
| ***H04R 3/00*** | (2006.01) |

(52) U.S. Cl.

CPC .......... *H01R 12/73* (2013.01); *H01R 12/716* (2013.01); *H04R 3/00* (2013.01); *H04R 2420/01* (2013.01); *H04R 2420/03* (2013.01)

(58) Field of Classification Search

CPC .... H01R 13/514; H01R 12/73; H01R 12/716; H04R 2420/01

See application file for complete search history.

(56) References Cited

U.S. PATENT DOCUMENTS 5,621,352 A 4/1997 Botti
6,998,871 B2 2/2006 Mulligan
(Continued)

FOREIGN PATENT DOCUMENTS

CN 101808854 A 8/2010
CN 102812727 A 12/2012
(Continued)

*Primary Examiner* — Rockshana D Chowdhury
*Assistant Examiner* — Douglas R Burtner

(57) ABSTRACT

Embodiments of a configurable loudspeaker using a user orientable routing card (120) that allows for multiple electrical drive modes in a non-powered loudspeaker system (122). The speaker has one or more drivers (126, 128) mounted in enclosure (124), an audio input interface configured to be coupled to an audio source (127) through one or more amplifiers (107, 127), and a connector interface configured to receive a routing card (120). The routing card is configured to be inserted in a first orientation to connect the audio input interface in a first operating mode with respect to driver selection and connection to the one or more amplifiers, and a second orientation to connect the audio input interface in a second operating mode with respect to driver selection and connection to the one or more amplifiers.

11 Claims, 9 Drawing Sheets

(56) References Cited

U.S. PATENT DOCUMENTS

| | | | | |
|---|---|---|---|---|
| 7,624,839 | B1 | 12/2009 | Graber | |
| 9,426,548 | B2 | 8/2016 | Rayner | |
| 9,820,029 | B2 | 11/2017 | Poulsen | |
| 9,877,107 | B2 * | 1/2018 | Painter | H04R 3/007 |
| 9,894,429 | B2 | 2/2018 | Risberg | |
| 10,321,232 | B2 | 6/2019 | Butler | |
| 2002/0071576 | A1 * | 6/2002 | Munro | H01R 31/08 381/409 |
| 2003/0067348 | A1 * | 4/2003 | Butler | H03F 3/217 330/10 |
| 2003/0097501 | A1 | 5/2003 | Young | |
| 2008/0090470 | A1 * | 4/2008 | Sumitani | H01R 31/08 439/709 |
| 2008/0280501 | A1 * | 11/2008 | Roemer | H01R 31/08 439/709 |
| 2009/0232331 | A1 | 9/2009 | Suyama | |
| 2012/0121105 | A1 | 5/2012 | Holladay | |
| 2013/0039527 | A1 | 2/2013 | Jensen | |
| 2013/0083939 | A1 * | 4/2013 | Fellers | G10K 11/002 381/71.11 |
| 2015/0326981 | A1 | 11/2015 | Bergner | |
| 2016/0041808 | A1 | 2/2016 | Pelland | |
| 2016/0198247 | A1 * | 7/2016 | Cheney | H04R 31/006 381/334 |
| 2016/0302004 | A1 * | 10/2016 | Dickins | H04R 3/00 |
| 2017/0127211 | A1 * | 5/2017 | Crockett | H04R 1/26 |
| 2017/0245055 | A1 * | 8/2017 | Sun | H04S 7/302 |
| 2017/0251296 | A1 * | 8/2017 | Smithers | H04R 3/14 |
| 2018/0027330 | A1 * | 1/2018 | Rand | G06F 13/387 381/309 |
| 2018/0227663 | A1 | 8/2018 | Hardesty | |
| 2018/0332384 | A1 | 11/2018 | Wilker | |
| 2018/0367939 | A1 * | 12/2018 | Fischer | H04S 7/305 |
| 2019/0158957 | A1 * | 5/2019 | Breebaart | H04M 1/03 |
| 2023/0327353 | A1 * | 10/2023 | Butler | H04R 3/00 361/736 |
| 2024/0155289 | A1 * | 5/2024 | Shuang | G10L 21/0364 |

FOREIGN PATENT DOCUMENTS

| | | | |
|---|---|---|---|
| CN | 103733514 | A | 4/2014 |
| CN | 107872748 | A | 4/2018 |
| CN | 207303335 | U | 5/2018 |
| CN | 109155889 | A | 1/2019 |
| EP | 2574015 | A1 | 3/2013 |
| JP | 2002152879 | A | 5/2002 |
| JP | 2003348815 | A | 12/2003 |
| WO | 2015102537 | A1 | 7/2015 |

* cited by examiner

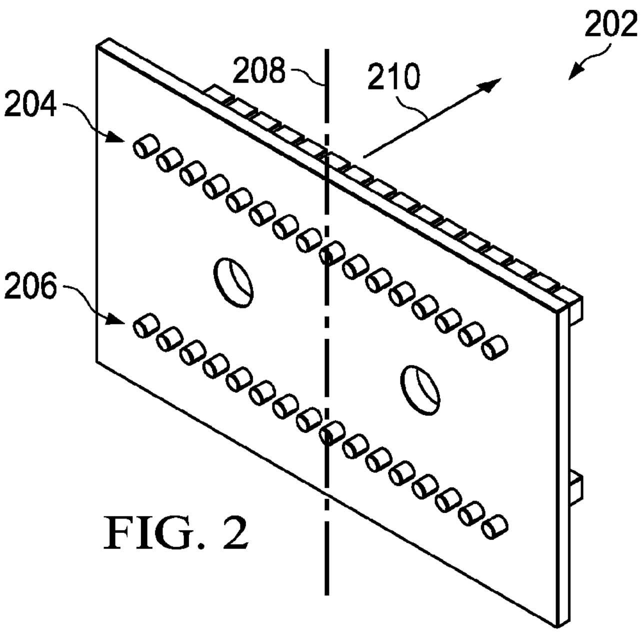
FIG. 2
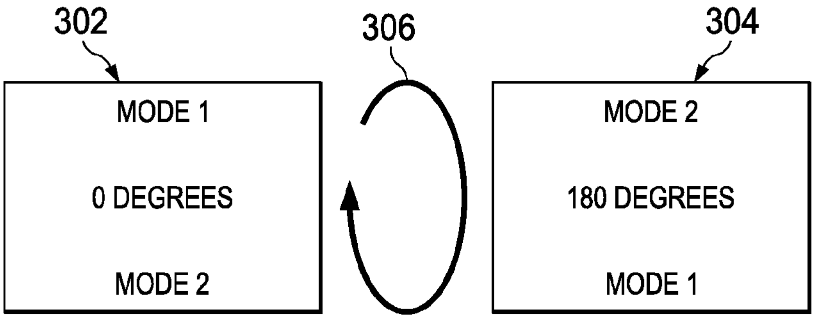
FIG. 3
FIG. 5A
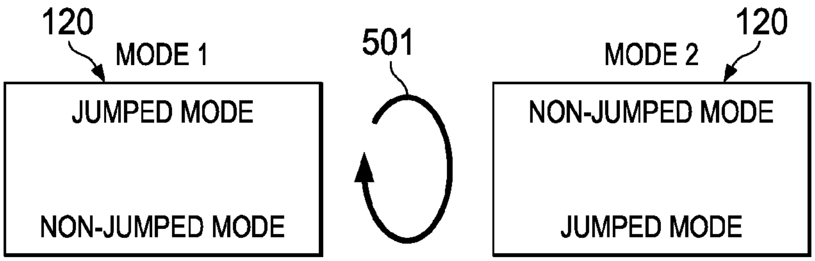
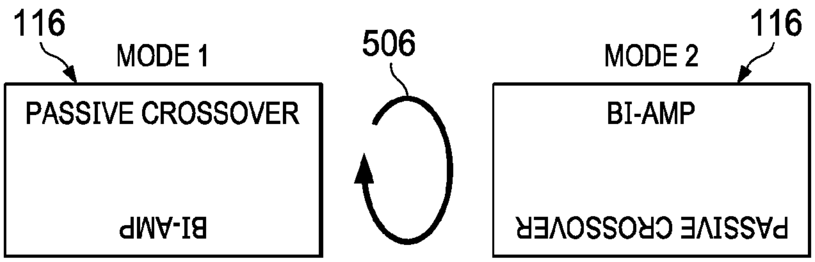
FIG. 5B

USER CONFIGURABLE AUDIO LOUDSPEAKER

CROSS-REFERENCE TO RELATED APPLICATIONS

This application is a National Phase entry of PCT Application No. PCT/US2021/046747, having an international filing date of Aug. 19, 2021, which claims priority to U.S. Provisional Application No. 63/067,563 and European Patent Application No. 20191732.5, both filed on Aug. 19, 2020, each of which is incorporated by reference in its entirety.

TECHNICAL FIELD

One or more implementations relate generally to configurable audio speakers, and more specifically to a user orientable routing card for switching between multiple operating modes in a speaker.

BACKGROUND

It is often desirable to design a loudspeaker such that it can be configured in different modes of operation, where such modes allow different amplifier drive configurations. For example, in low-frequency dual woofer loudspeaker cabinets, two drive configurations (or 'modes') are possible: (1) a single amplifier driving both woofers where the woofers are electrically connected in parallel, or (2) two amplifiers driving each woofer independently. Another common use case where a configurable loudspeaker is a traditional two-way speaker having a low/mid-frequency transducer and a high-frequency transducer in a single cabinet. For this speaker, two possible drive modes are: (1) a passive mode where a single amplifier drives both transducers and a passive crossover circuit is included within the loudspeaker cabinet to divide the single drive signal into low and high frequencies for driving the respective transducers, or (2) a bi-amp or (active) mode where two amplifiers drive each transducer independently without using the internal passive crossover within the loudspeaker enclosure.

Other types or speaker configurations may have different operating modes that allow the same speaker to be operated differently based on connections between external amplifiers, internal drivers, and any optional internal audio processing circuitry.

Present systems use complicated terminal block configurations, jumper wires, rotary switches, or other similar patch cable-type solutions to configure a speaker to operate in one of possibly several different operating modes. Still others require the user to open the system and cut and reconnect internal wires, while remaining systems may lack this functionality altogether. As can be seen configuring passive loudspeakers for different amplifier connections is complex, difficult, or simply not possible.

SUMMARY OF EMBODIMENTS

Embodiments include a user configurable speaker having one or more drivers mounted in enclosure forming an at least partially enclosed volume, an audio input interface configured to be coupled to an audio source through one or more amplifiers, and a connector interface configured to receive a routing card, wherein the routing card is insertable in a first orientation to connect the audio input interface to the audio source in a first operating mode with respect to driver selection and connection to the one or more amplifiers, and a second orientation to connect the audio input interface to the audio source in a second operating mode with respect to driver selection and connection to the one or more amplifiers (e.g. the second operating mode being different from the first operating mode with respect to the driver selection and connection to the one or more amplifiers). Accordingly, the first operating mode may comprise a first driver selection and connection to the one or more amplifiers and the second operating mode may comprise a second driver selection and connection to the one or more amplifiers. The routing card may be a printed circuit board (PCB) having a connector side comprising a set of connectors for connection to a corresponding connector set on the connector interface. The routing card has a set of conductive traces, where a first direction of the traces couples the set of connectors together in a first routing scheme for the first operating mode, and a second direction of the traces couples the set of connectors together in a second routing scheme for the second operating mode. The set of connectors of the PCB may comprise two rows of connectors disposed proximate opposite edges of the connector side and arranged opposite a central axis of symmetry of the PCB. The first direction is selected by connecting the routing card to the connector interface in a first rotational orientation relative to the central axis, and the second direction is selected by connecting the routing card to the connector interface in a second rotational orientation relative to the central axis. The speaker may have a receptacle formed into a surface of the enclosure and providing access to the connector interface for coupling the connector side of the routing card to the corresponding connector set on the connector interface. The receptacle may be of a size suitable to allow a user to reach in by hand and grasp the routing card for insertion and removal to and from the corresponding connector set on the connector interface. The connector interface may comprise two sets of connections between the audio interface, the one or more drivers, and one or more audio processing circuits of the speaker. Inserting the routing card in the first orientation selects a first set of connections for audio signals among the audio interface, the drivers, and the audio processing circuits, and inserting it in the second orientation selects a second set of connections for the audio signals among the audio interface, the drivers, and the audio processing circuits.

The one or more drivers may comprise two woofers and the audio input interface is coupled to at least two amplifiers, and the first mode comprises each of the two woofers driven by a single amplifier, and the second mode comprises each of the two woofers driven independently by a respective amplifier.

The one or more drivers may comprise a woofer and a tweeter, and the audio input interface is coupled to at least two amplifiers, and the first mode comprises the woofer and tweeter both driven by a single amplifier with a crossover circuit directing appropriate audio frequency signals to the woofer and to the tweeter, and the second mode comprises each of the woofer and tweeter driven independently by a respective amplifier without the crossover circuit.

When the routing card is inserted/received in the connector interface in the first orientation, the speaker may be caused to operate in the first operating mode by providing, through the connector interface and the routing card, a first routing of audio signals (e.g. received by the audio input interface) between the audio input interface and the one or more drivers. When the routing card is inserted/received in the connector interface in the second orientation, the speaker may be caused to operate in the second operating mode by providing, through the connector interface and the routing card, a second routing of audio signals (e.g. received by the audio input interface) between the audio input interface and the one or more drivers. In other words, embodiments may include a user configurable speaker comprising: one or more drivers mounted in an enclosure forming an at least partially enclosed volume; an audio input interface configured to be coupled to an audio source through one or more amplifiers (e.g. to receive audio signals); and a connector interface configured to receive a routing card, wherein the routing card is insertable in a first orientation to cause the speaker to operate in a first operating mode by providing, through the connector interface and the routing card, a first routing of audio signals (e.g. received by the audio input interface) between the audio input interface and the one or more drivers, and a second orientation to cause the speaker to operate in a second operating mode by providing, through the connector interface and the routing card, a second routing of audio signals (e.g. received by the audio input interface) between the audio input interface and the one or more drivers. The connector interface may be coupled between the one or more drivers and the audio input interface.

In embodiments wherein the routing card comprises or is a PCB, the PCB may comprise a set of conductive traces coupling the set of connectors of the connector side of the PCB together such that, when the PCB is inserted with the first orientation in the connector interface, the traces (and the set of connectors of the connector side of the PCB) couple the set of connectors on the connector interface together in a first routing scheme thereby causing the speaker to operate in the first operating mode, and such that, when the PCB is inserted with the second orientation in the connector interface, the traces (and the set of connectors of the connector side of the PCB) couple the set of connectors on the connector interface together in a second routing scheme thereby causing the speaker to operate in the second operating mode.

The set of connectors of the connector side of the PCB may comprise first and second rows of connectors and the corresponding set of connectors on the connector interface may comprises first and second rows of connectors. When the routing card/PCB is inserted with the first orientation in the connector interface, the first row of connectors of the connector side of the PCB is coupled to the first row of connectors on the connector interface and the second row of connectors of the connector side of the PCB is coupled to the second row of connectors on the connector interface (thereby causing the speaker to operate in the first operating mode). When the routing card/PCB is inserted with the second orientation in the connector interface, the first row of connectors of the connector side of the PCB is coupled to the second row of connectors on the connector interface and the second row of connectors of the connector side of the PCB is coupled to the first row of connectors on the connector interface (thereby causing the speaker to operate in the second operating mode). The first and second rows of connectors of the connector side of the PCB may be disposed proximate to opposite edges of the connector side and arranged opposite a central axis of symmetry of the PCB.

Embodiments may also include a speaker configurator for routing audio signals in a speaker, the speaker comprising one or more drivers, where the speaker configurator comprises a printed circuit board (PCB) having a set of traces laid out such that a first orientation of the PCB is configured to cause a speaker to operate in a first mode by routing audio signals within the speaker to a first routing between the drivers and one or more amplifiers external to the speaker, and a second orientation of the PCB is configured to cause the speaker to operate in a second mode by routing the audio signals to a second routing between the drivers and the one or more amplifiers, and a connector interface configured to connect to the PCB in the first orientation to connect the drivers to the one or more amplifiers in the first mode, and to connect to the PCB in the second orientation to connect the drivers to the one or more amplifiers in the second mode.

Embodiments may further include a method of changing an operating mode of a configurable speaker having one or more drivers by providing a printed circuit board (PCB) having a set of traces laid out such that a first orientation of the PCB is configured to cause a speaker to operate in a first mode by routing audio signals within the speaker to a first routing between the drivers and one or more amplifiers external to the speaker, and a second orientation of the PCB is configured to cause the speaker to operate in a second mode by routing the audio signals to a second routing between the drivers and the one or more amplifiers, and providing a connector interface configured to connect to the PCB in the first orientation to connect the drivers to the one or more amplifiers in the first mode, and to connect to the PCB in the second orientation to connect the drivers to the one or more amplifiers in the second mode.

Embodiment may further include a method of changing an operating mode of a configurable speaker having one or more drivers, an audio input interface configured to be coupled to an audio source through one or more amplifiers; and a connector interface configured to receive a routing card, the method comprising:

- inserting a printed circuit board (PCB) in the connector interface in a first orientation or a second orientation, the PCB having a set of conductive traces laid out such that inserting the PCB in the connector interface in the first orientation causes the speaker to operate in a first operating mode by routing audio signals within the speaker to a first routing between the one or more drivers and the one or more amplifiers, and such that inserting the PCB in the connector interface in the second orientation causes the speaker to operate in a second operating mode by routing the audio signals to a second routing between the drivers and the one or more amplifiers.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 illustrates a routing card for use with a configurable multi-way loudspeaker, under some embodiments.

FIG. 3 schematically illustrates the orientation of a routing card in two different orientations to configure the loudspeaker in one of two different modes, under some embodiments.

FIG. 5A schematically illustrates an orientation of a routing card between non-jumped and jumped modes for the dual woofer speaker of FIG. 1A, under some embodiments.

FIG. 5B schematically illustrates an orientation of a routing card between passive crossover and active/bi-amp modes for the two-way speaker of FIG. 1B, under some embodiments.

DETAILED DESCRIPTION

Embodiments are directed to a configurable audio loudspeaker with a user orientable routing card for selecting one of multiple electrical drive modes and/or audio processing configurations. Any of the described embodiments may be used alone or together with one another in any combination. Although various embodiments may have been motivated by various deficiencies with the current and known solutions, which may be discussed in the specification, the embodiments do not necessarily address any of these deficiencies. Different embodiments may address different deficiencies, and some may only be partially addressed.

The term "speaker" or "loudspeaker" means an audio playback speaker having a cabinet enclosing one or more drivers, where the term "driver" means an individual audio transducer that converts an electrical audio signal into sound waves, and may be implemented as a cone, horn, microspeaker, or planar driver, and may be a full-range driver or configured to playback a certain frequency range, such as a tweeter, mid-range driver, woofer, sub-woofer, and so on. A driver may be mounted within a cabinet or to an open backed baffle. The term "cabinet" means a speaker enclosure or box that houses the transducer or transducers (or drivers) and that may be wholly enclosed to acoustically isolate the transducers, or vented or partially open if required for certain audio response characteristics.

A loudspeaker used with rotatable routing card can be configured in different modes of operation, such as with various types of cabinet shapes and sizes, drivers (tweeters, mid-range, woofer) in a two-way or multi-way speaker, passive/active operation, and so.

Figure 1A:
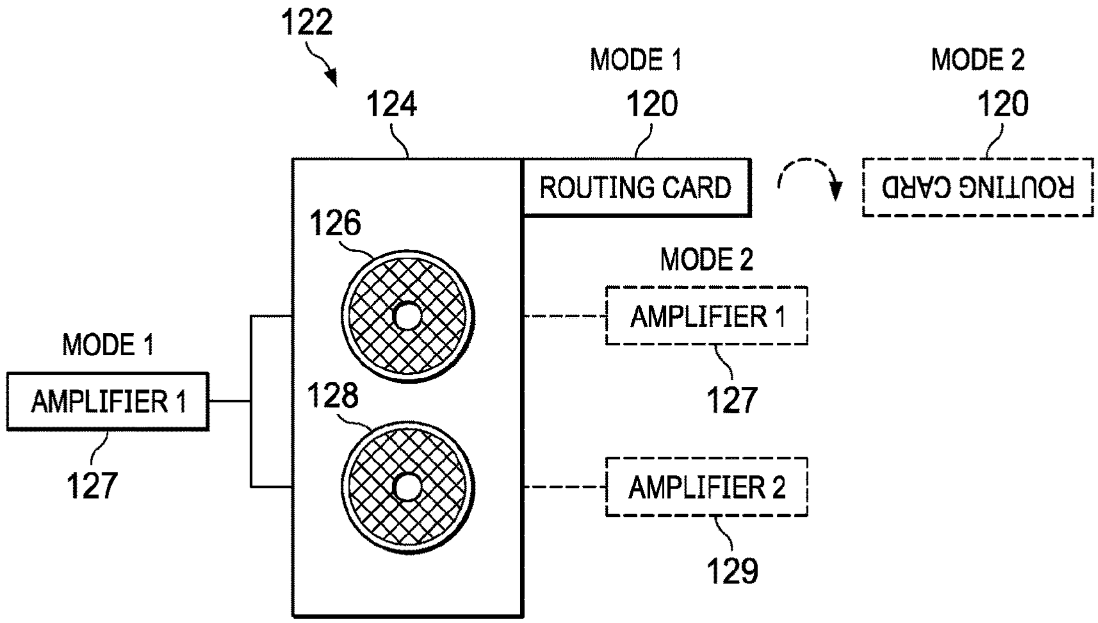
FIG. 1A illustrates an example two-woofer loudspeaker with a routing card selecting between jumped and non-jumped modes of operation, under some embodiments.

The speaker can be configurable to operate in one of a number of different drive settings based on the operation of the different drivers within the speaker and/or the operation of one or more amplifiers driving different drivers within the speaker. FIG. 1A illustrates an example audio speaker 122 having a cabinet 124 holding two woofers 126 and 128. For this direct-drive embodiment, two amplifiers 127 and 129 each drive a respective woofer 126 and 128. For this embodiment, the speaker system 122 is a passive speaker that does not include any internal amplifiers or power supplies. It simply takes amplified audio signals from the amp or amps for playback through the woofers. The woofers may be directly driven by their own respective amplifier or they may be driven by a single amplifier, such as amplifier 127. For this embodiment, an insertable routing card 120 can be used to set the appropriate amplifier-to-driver connections with respect to direct-drive or single-drive modes. For example, inserting the routing card 120 in a first orientation (denoted "Mode 1") can connect both woofers to one amplifier (single-drive), while inserting the card in a second (rotated) orientation (denoted "Mode 2") can connect each woofer to its own amplifier (dual-drive or direct-drive).

Figure 1B:
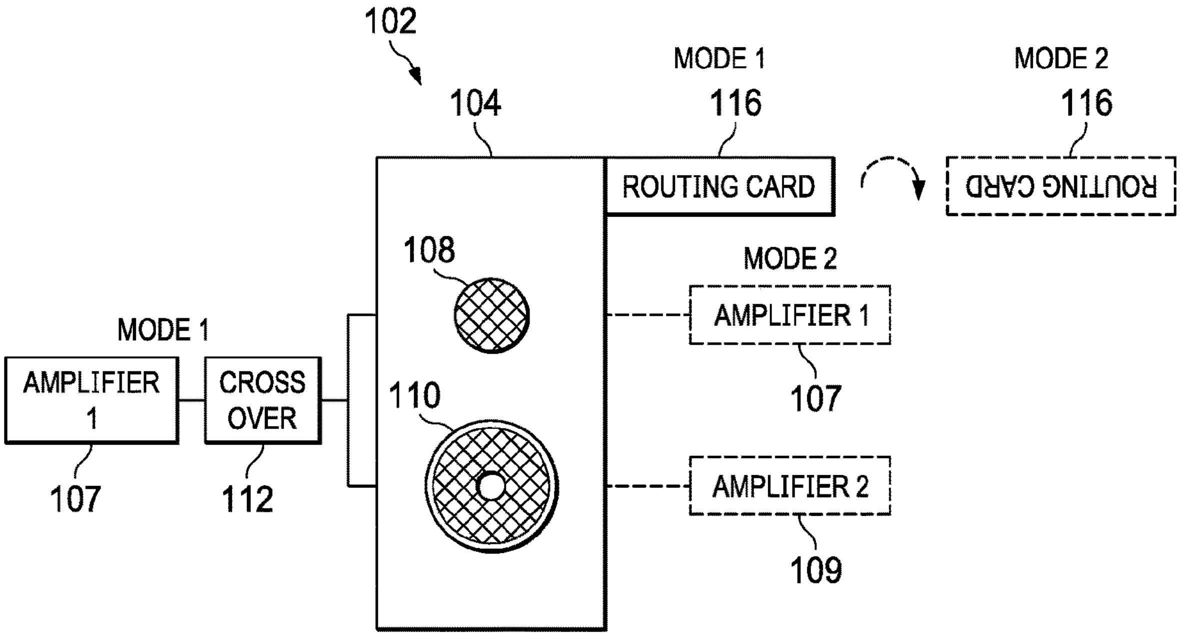
FIG. 1B illustrates an example two-way loudspeaker with a routing card selecting between passive crossover and active/bi-amp modes, under some embodiments.

FIG. 1B illustrates a different two-way speaker using a rotatable routing card, under some embodiments. As shown in FIG. 1B, two-way speaker 102 comprises a cabinet 104 that holds a tweeter 108 and a woofer 110. For the embodiment shown, the drivers are aligned along an axis of cabinet 104, such as along the vertical axis of the cabinet for a standing speaker. The driver composition and configuration of speaker 102 is shown for example only, and any size or orientation of speaker 102 may be used, such as a horizontal speaker, soundbar, cube speaker, bookshelf or table top speaker and so on. Likewise, any number, array, and type of driver may be used, such as tweeters, additional midrange drivers, and so on. In an embodiment, a passive crossover circuit 112 is provided to route different audio signal components to the appropriate speaker. In a two-way speaker 102, low frequency signals (e.g., less than 1 KHz to 2 KHz) can be sent to the woofer 110, while higher frequencies can be sent to driver (e.g., tweeter) 108. A insertable routing card 116 can be used to set the appropriate speaker connections with respect to crossover 112 and/or other processing circuits in speaker 102. For example, inserting the routing card 116 in a first orientation (denoted "Mode 1") can include crossover 112 in the audio path to drivers 108 and 110, while inserting the card in a second (rotated) orientation (denoted "Mode 2") can cut the crossover out of the audio path, and provide individually amplified signals to each driver.

As described above, a routing card is configured to select between two modes of operation for any appropriately configured speaker. Thus, FIGS. 1A and 1B illustrate speakers that can be configured to operate in one of two operating modes each, by inserting a routing card into the speaker in one of two different possible orientations.

FIG. 1A illustrates a first use case 122 in which the speaker is a dual woofer speaker with a cabinet 124 enclosing two woofers 126 and 128. Either one or two amplifiers 127 and 129 may be provided to drive the woofers depending on a mode configuration of the speaker. The speaker also includes an interface for connecting a rotatable routing card 120 in one of two different orientations to select between one of the two modes. The first mode (mode 1) is a configuration in which a single amplifier 127 drives both woofers 126 and 128 in parallel. This is referred to as a single drive jumped mode for the speaker and is selected by inserting the routing card 120 in a first orientation to the interface. The second mode (mode 2) is a configuration in which a second amplifier 129 is provided in addition to amplifier 127 and each woofer 126 and 128 are each driven by a separate amplifier. This mode is referred to as a dual drive (or direct drive), non-jumped mode and is selected by inserting the routing card 120 in a second orientation to the interface.

FIG. 1B illustrates a second use case 102 in which the speaker is a two-way speaker with a cabinet 104 enclosing two different drivers, such as a mid-range or woofer 110 and a tweeter 108. Either one or two amplifiers 107 and 109 may be provided to drive the two drivers depending on a mode configuration of the speaker. The speaker also includes an interface for connecting a rotatable routing card 116 in one of two different orientations to select between one of the two modes. The first mode (mode 1) is a configuration in which a single amplifier 107 drives both drivers 126 and 128 in parallel through a crossover circuit 112. This is referred to as a passive mode for the two-way speaker and is selected by inserting the routing card 116 in a first orientation to the interface. The second mode (mode 2) is a configuration in which a second amplifier 109 is provided in addition to amplifier 107 and each driver 110 and 108 are each driven by a separate amplifier. This mode is referred to as a bi-amp active mode and is selected by inserting the routing card 116 in a second orientation to the interface.

Both use cases (FIG. 1A and FIG. 1B) generally represent common use cases in professional loudspeaker design, however embodiments are not so limited. Any configuration of amplifier and driver configuration and connectivity, and audio signal routing from the amp or amps to the different drivers may be used. Detailed wiring connections for the routing card speaker interface for the different use cases and modes for the examples of FIGS. 1A and 1B will be provided in greater detail below.

Table 1 illustrates in tabular form the two use cases of FIGS. 1A and 1B with the corresponding operating modes and routing card configurations, and number of amplifiers used for each mode. It should be noted that any number of use cases may be used based on speaker configuration (number of drivers, types of drivers), associated audio processing (crossovers, filters, EQs, etc.), amplifiers, and so on. A different routing card may be provided to easily select between two different operating modes for each use case or speaker configuration.

TABLE 1

| USE CASE | MODE | CARD CONFIGURATION | AMPS |
|---|---|---|---|
| DUAL-WOOFER | Jumped | Routing Card A 0° | 1 |
| | Non-Jumped | Routing Card A 180° | 2 |
| TWO-WAY | Passive | Routing Card B 0° | 1 |
| | Active/Bi-amp | Routing Card B 180° | 2 |
| . . . | . . . | . . . | . . . |

The use of a routing card (120 or 116) generally simplifies and makes easily repeatable the process of switching between multiple loudspeaker system modes for different use cases. In an embodiment, the routing card is implemented as a printed circuit board PCB that can be installed by the user in one of two different orientations that correspond to the one of two different modes of operation, such as single-drive versus dual-drive for the dual woofer use case, or passive crossover mode versus active/bi-amp mode for the two-way use case. The PCB can be easily rotated and re-inserted to change the operational mode of the loudspeaker, allowing for rapid reconfiguration of the loudspeaker electrical drive with respect to amplifiers and audio circuitry (e.g., crossovers).

Although FIGS. 1A and 1B illustrates one speaker coupled to one or more amplifiers, it should be noted that an overall audio system may include any number of speakers in a stereo, multi-channel, surround-sound, cinema or similar environment. Some or all of such speakers may be configurable speakers, as shown for speaker 102 or 122.

FIG. 2 illustrates a routing card for use with a configurable multi-way loudspeaker, under some embodiments. As shown in FIG. 2, the routing card 202 is provided in the form a PCB with two separate rows of connectors 204 and 206. The PCB 202 is wired such that it is symmetrical around a common central (e.g., vertical or horizontal) axis 208. Inside the loudspeaker, a separate PCB interface circuit resides to provide mating connectors for the routing PCB card and provide any necessary internal signals. The internal PCB and the external routing PCB are designed to have symmetrical mating connectors such that the routing PCB can be mated to the internal PCB at different rotational angles. The user can change between two modes of operation by rotating the routing PCB card by 180 degrees and re-installing it in the speaker.

To achieve proper routing control and electrical current handling, the routing PCB card is designed with the copper layers in a symmetrical, mirrored layout. FIG. 3 schematically illustrates the orientation of a routing card in two different orientations to configure the loudspeaker in one of two different modes, under some embodiments. FIG. 3 illustrates the card in a first orientation 302 in which a first mode (mode 1) is selected when the card is inserted or mounted in the speaker. After a rotation or "flip" operation 306, the card is rotated 180 degrees to select mode 2 instead of mode 1. The routing PCB card has simply been rotated 180 degrees to change the signal routing between the two rows of mating connectors in the speaker.

Figure 4:
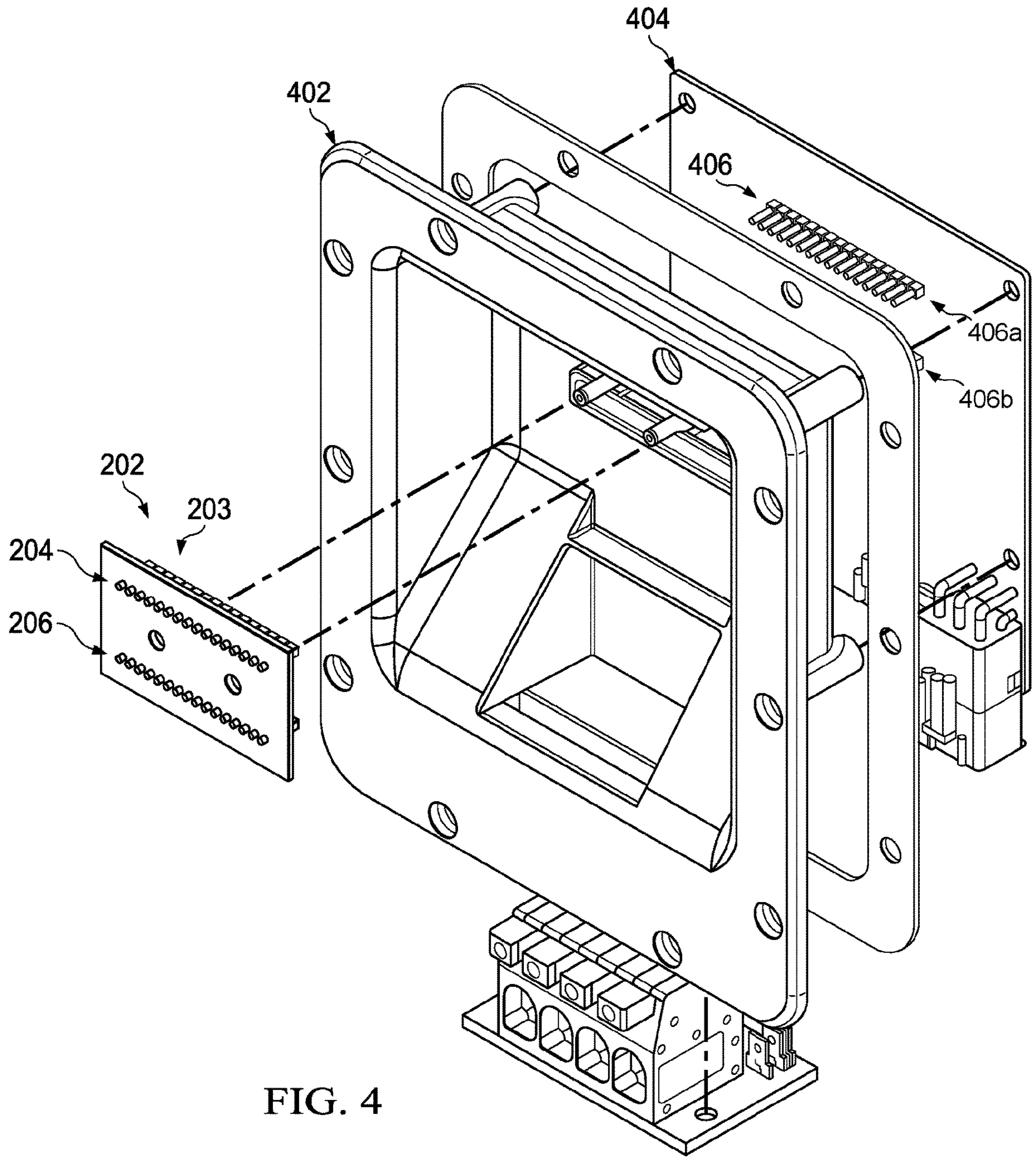
FIG. 4 illustrates insertion of a routing card into a speaker receptacle, under some embodiments.

As shown in the example of FIG. 2, The card is configured to be inserted into a receptacle in the speaker in the direction of arrow 210, and the connector rows (or sets) 204 and 206 make contact with or are inserted into corresponding pins or sockets in the receptacle. FIG. 4 illustrates insertion of a routing card into a speaker receptacle, under some embodiments. As shown in FIG. 4, the routing card 202 is inserted into receptacle 402 that is attached to an interface card 404 that couples to the driver connections in the speaker. The interface card 404 may be a separate PCB connected to the speaker or it may be integrally formed in the cabinet panel. The receptacle 402 may be placed or formed into the speaker cabinet in any appropriate locations, such as on the back panel, top panel or front panel, as desired. It is typically of a format large enough to allow a user to easily grasp, remove, and insert card 202 in the cabinet panel.

The interface card 404 has a set of connectors 406 that mate with the corresponding connectors 203 of rows 204 and 206 on the back side of routing card 202. For the embodiment shown in FIG. 4, the interface card 404 has two rows of male, pin-header connectors 406 (e.g. first row of connectors 406*a* and second row of connectors 406*b*) and the routing PCB card has two rows of female, pin sockets 203 (e.g. of first row 204 and second row 206), but embodiments are not so limited, as any type and configuration of mating connectors or contact surfaces may be used. To switch between the two modes (mode 1 and mode 2) as shown in FIG. 3, the routing card 202 is removed from the receptacle 402, flipped around (rotated 180 degrees) and reinserted into the receptacle so that the opposite set of connectors 203 is coupled to the set of connectors 406 in the speaker (e.g. 204 to 406*b* and 206 to 406*a*).

In an embodiment, the routing card is simply an arrangement of symmetrical copper wires, the internal interface card 404 in conjunction with the rotational insertion (302 or 304) of the routing card ultimately determine the mode of operation of the speaker in any particular use case. In an embodiment, the routing card comprises a set of conductive traces wherein a first direction of the traces couples the set of connectors together in a first routing scheme for the first operating mode, and a second direction of the traces couples the set of connectors together in a second routing scheme for the second operating mode. As shown in FIG. 2, the set of connectors comprises two rows of connectors disposed proximate opposite edges of the connector side of the PCB and arranged opposite a central axis of symmetry of the PCB. As shown in FIG. 3, the first direction is selected by connecting the routing card to the connector interface in a first rotational orientation relative to the central axis, and the second direction is selected by connecting the routing card to the connector interface in a second rotational orientation relative to the central axis.

For the embodiments of FIG. 2 and FIG. 4, the routing card 202 is shown as a rectangular shaped PCB with terminals arrayed in rows on the same side of the PCB and disposed along the long edge of the connector side of the PCB. These rows are configured to mate to the corresponding connector rows 406 on the internal connector card 404 by inserting the routing card connector side first into the receptacle 402.

It should be noted that any size and shape of routing card may be used presuming the same configuration for the internal connector card. For example the routing card may be square, or have connectors along adjacent edges as opposed to opposite edges, or any other configuration as long as a symmetry about an axis rotation is maintained and matched by a corresponding set of connectors on the internal connector card. The mating connectors between the routing card 202 and internal connector card 404 are shown as a pin and socket type connection. Other connection means may also be used, such as surface mount connections in which traces on the routing card slide into corresponding slots of the internal connector card, or vice-versa. For purposes of description, the routing card is described as having a connector side and terminals arrayed on opposite edges of that side of the routing card so that the connectors can be swapped for reinsertion by rotating the card 180 degrees, but it should be noted that other configurations are also possible.

The different modes, Mode 1 and Mode 2, of FIG. 3 represent any two different operational modes of the configurable loudspeaker. As stated above, there are two main use cases where configurability of the loudspeaker drive is desired: (1) switching a multi-woofer, low frequency cabinet between single or multi-amplifier (e.g., bi-amp) drive (FIG. 1A), and (2) switching a two-way loudspeaker between a single amplifier, passive crossover mode and multi-amplifier active drive mode (FIG. 1B). FIG. 5A schematically illustrates an orientation of routing card 120 for the dual-woofer use case configured between jumped mode (single amplifier) and dual-mode (dual amplifier). As shown in FIG. 5A, the first mode orientation of routing card 120 puts the dual-woofer speaker in a jumped mode configuration for use with one amplifier. The second mode orientation is achieved by removing and reinserting the card after a 180 degree rotation 501 to put the speaker in a jumped mode configuration for use with two separate amplifiers. FIG. 5B schematically illustrates an orientation of routing card 116 for the two-way speaker use case configured between passive mode (with crossover) and active/bi-amp mode (no crossover). As shown in FIG. 5B, the first mode orientation of routing card 116 puts the two-way speaker in a passive mode configuration for use with one amplifier with crossover. The second mode orientation is achieved by removing and reinserting the card after a 180 degree rotation 506 to put the speaker in an active/bi-amp mode configuration for use with two separate amplifiers and no crossover.

Figure 6:
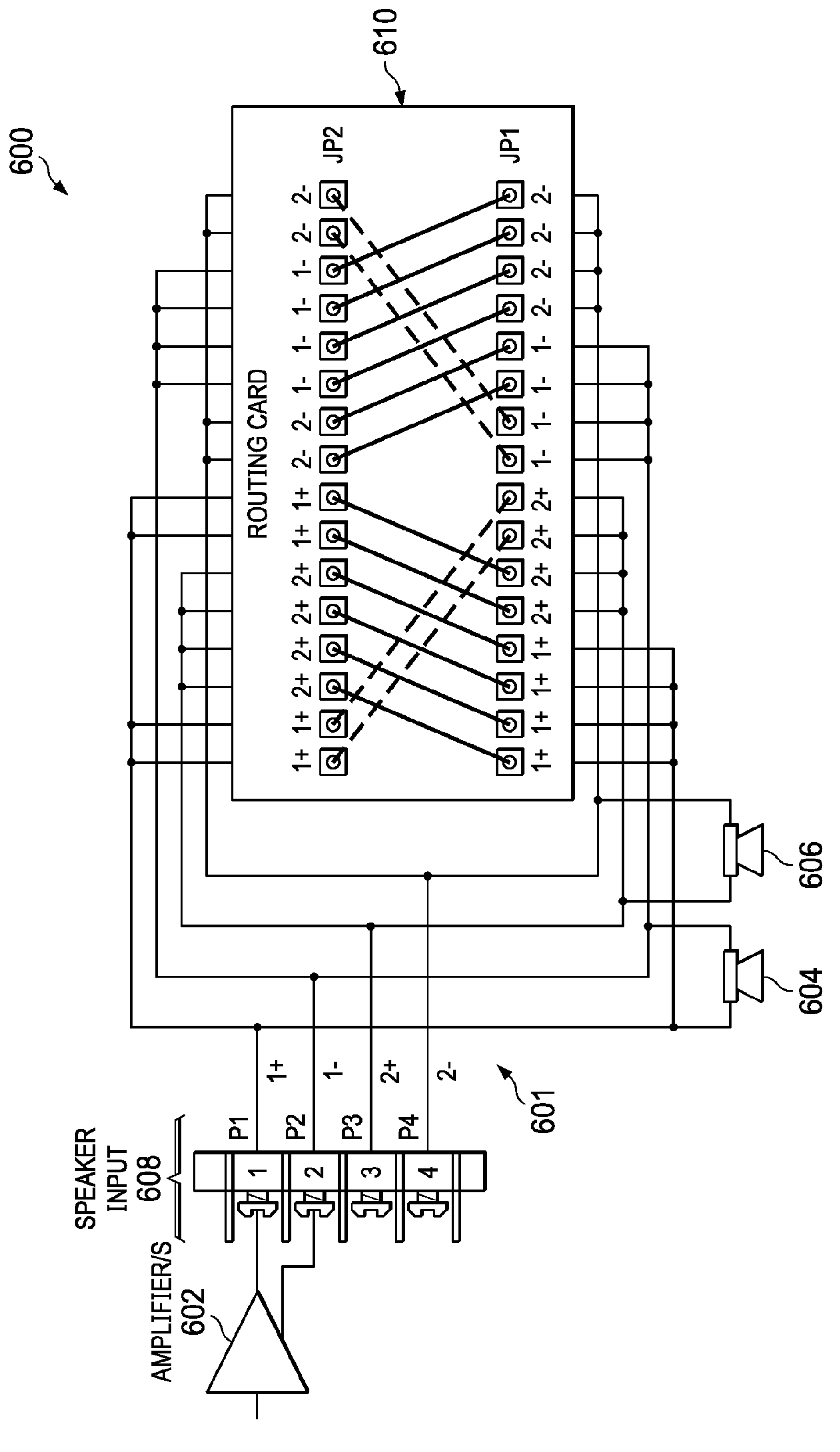
FIG. 6 illustrates an electrical schematic for a dual woofer speaker in a single drive jumped mode, under some embodiments.
Figure 7:
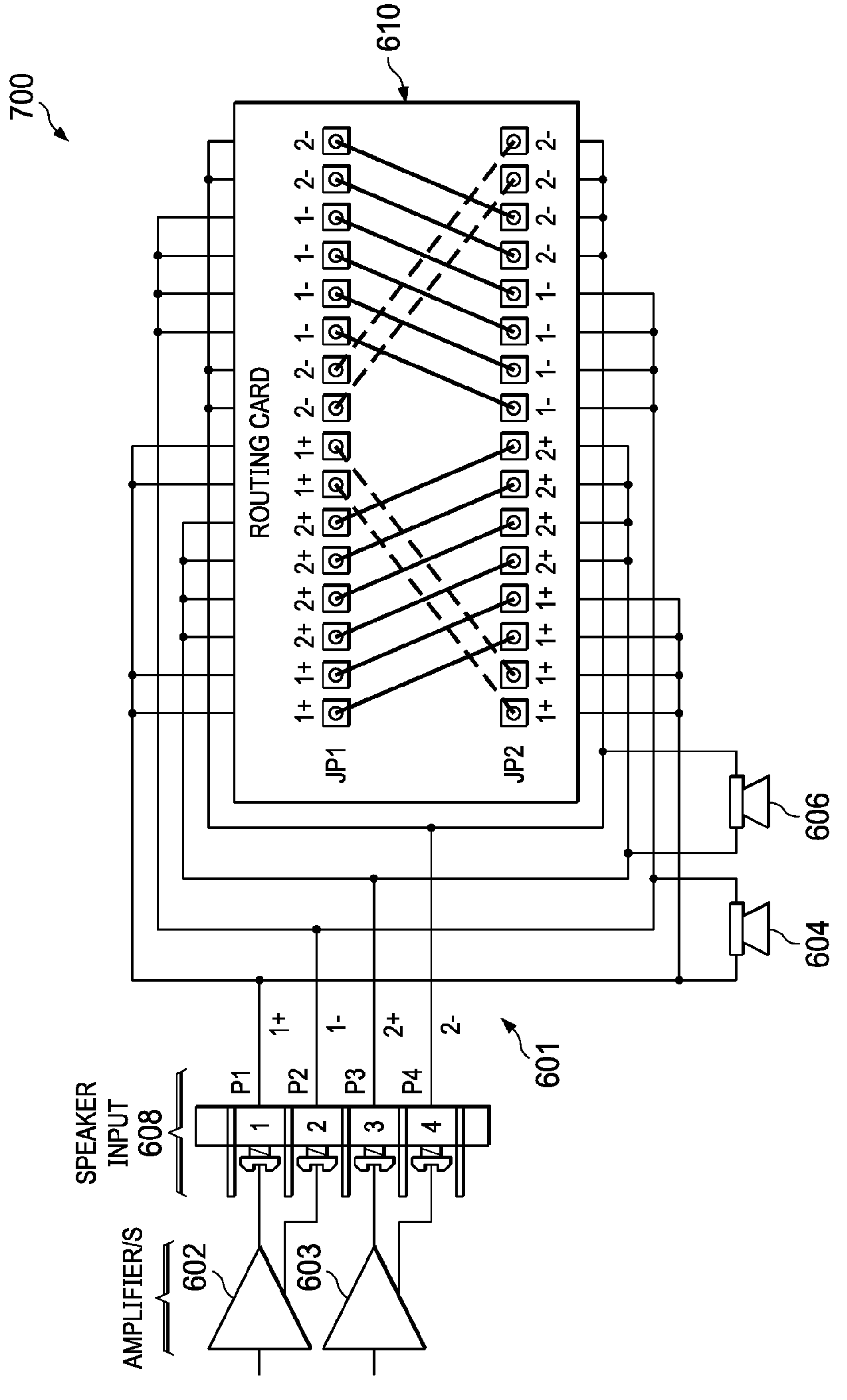
FIG. 7 illustrates an electrical schematic for a dual woofer speaker in a dual drive non-jumped mode, under some embodiments.

As shown in FIG. 1A, the routing card 120 can be used to select between a single drive jumped mode or dual drive non-jumped mode for a dual woofer speaker. FIGS. 6 and 7 illustrate circuit connections for the amplifiers, drivers, interfaces, and the routing card for each of these two modes, denoted mode 1 and mode 2 in FIG. 1A.

FIG. 6 illustrates an electrical schematic for a dual woofer speaker in a single drive jumped mode, under some embodiments. As shown in FIG. 6, diagram 600 shows a single amplifier 602 coupled to dual woofers 604 and 606 through a speaker input terminal 608, which is typically a back-panel plug, screw, or other similar wiring interface to connect the amplifier cables to the speaker. Inside the speaker, wires 601 send the amplified audio signals to the drivers 604 and 606. The audio signals are routed through routing card 610, which can be oriented in the speaker in one of two ways. For the embodiment of FIG. 6, the routing card 610 is routed to allow a single amplifier 602 connected to terminal 608 to drive both drivers 604 and 606 in parallel. This is a single drive jumped mode for the dual woofer speaker.

The routing card 610 has two separate rows of connectors for mating to the interface card 404 of the receptacle. These connectors (denoted rows JP1 and JP2) can be provided as rows of pins or other contacts disposed on different (e.g., opposite) sides of the routing card. For the example of FIG. 6, the routing card 610 is shown in an orientation of connectors JP2 above connectors JP1.

When the routing card 610 is rotated (flipped) and inserted into the speaker in the opposite orientation, a different operating mode of speaker system 600 is selected, such as single drive versus dual drive using two amps. FIG. 7 illustrates an electrical schematic for a dual woofer speaker in a dual drive non-jumped mode, under some embodiments. As shown in FIG. 7, diagram 700 shows two amplifiers 602 coupled to the dual woofers 604 and 606 through the speaker input terminal 608. Inside the speaker, wires 601 send the amplified audio signals to the drivers 604 and 606, as in diagram 600. The audio signals are routed through routing card 610, which is inserted in an opposite orientation to that of diagram 600. For the embodiment of FIG. 7, the routing card 610 is routed to allow each amplifier 602 and 603 connected to terminal 608 to separately drive a different respective driver 604 and 606. This is a dual drive non-jumped mode for the dual woofer speaker. For the example of FIG. 7, the routing card 610 is shown in an orientation of connectors JP1 above connectors JP2.

It can be seen that the physical wiring between the speaker input terminal 608, the routing card receptacle, and the drivers are the same for either configuration of FIG. 6 or 7. The orientation of the rotatable routing card 610 dictates the actual connections of the wiring between the amp or amps connected to the terminal 608 and the woofers 604 and 606.

FIGS. 1A, 6, and 7 illustrate a speaker with two woofers, though embodiments are not so limited. Any practical number of drivers (e.g., woofers) and amplifiers may be provided. If more than two woofers are provided, a corresponding number of additional amplifiers would also need to be provided to maintain the independent drive operation of FIG. 7. In the jumped mode configuration of FIG. 6, if more than two woofers are provided, amplifier 602 would be wired through terminal 608 to drive those woofers as well.

As shown in FIG. 1B, another multi-mode use case for a speaker with a rotatable routing card is one in which a two-way speaker is configured to implement use a crossover or in a passive mode, or directly drive the drivers in a bi-amp active mode. The passive crossover implementation requires the passive crossover network to be included in the circuit, or completely removed depending on the routing card orientation. Ensuring the passive crossover is properly removed from the electrical circuit can be difficult and requires multiple signals to be "broken" to properly disconnect the crossover from the drive and load circuitry.

Figure 8:
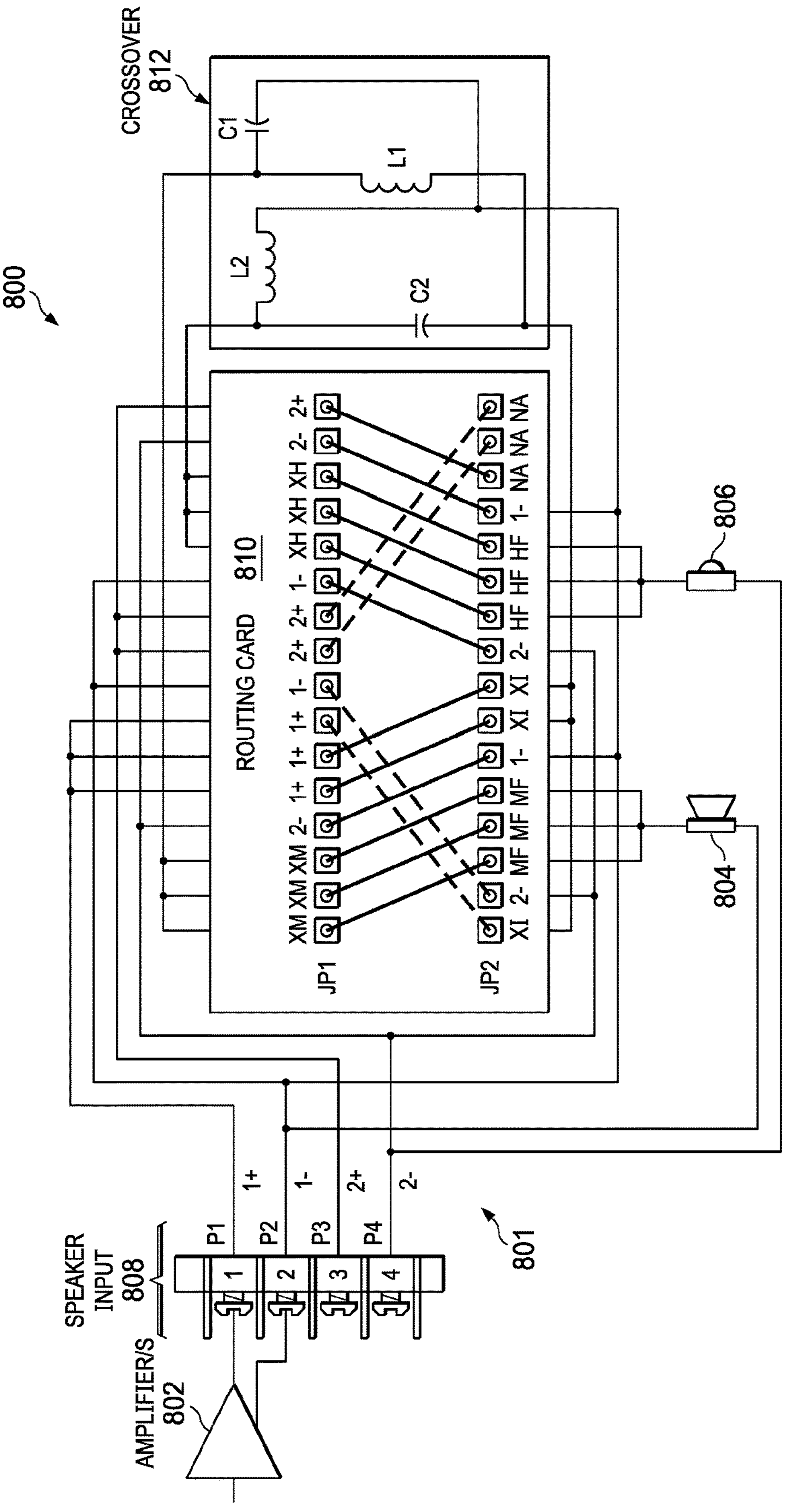
FIG. 8 illustrates an electrical schematic for a two-way speaker in a passive mode, under some embodiments.
Figure 9:
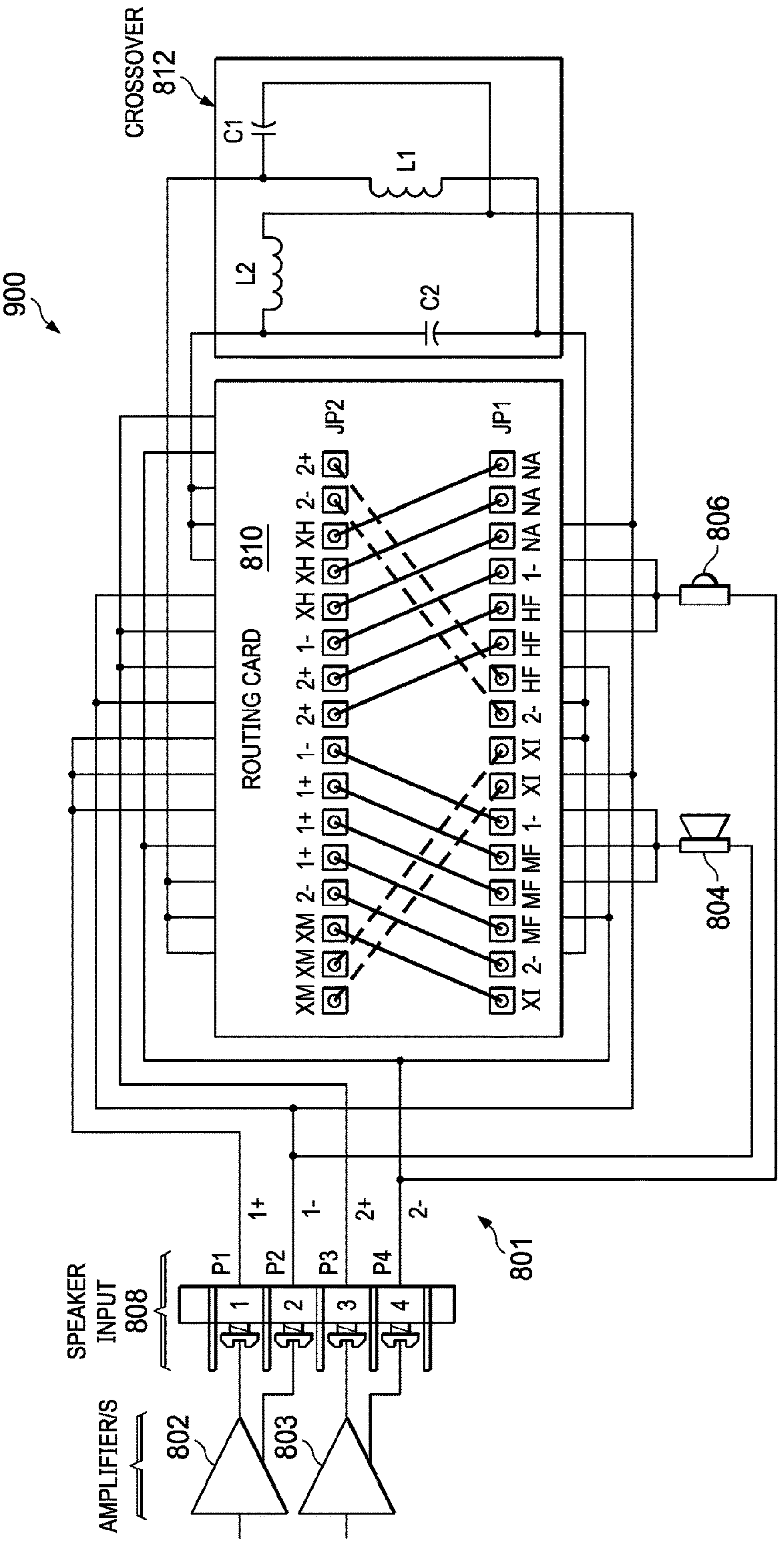
FIG. 9 illustrates an electrical schematic for a two-way speaker in a bi-amp active mode, under some embodiments.

As shown in FIG. 1B, the routing card 120 can be used to select between a passive mode or bi-amp active mode for a two-way speaker. FIGS. 8 and 9 illustrate circuit connections for the amplifiers, drivers, interfaces, and the routing card for each of these two modes, denoted mode 1 and mode 2 in FIG. 1B.

FIG. 8 illustrates an electrical schematic for a two-way speaker in a passive mode, under some embodiments. As shown in FIG. 8, diagram 800 shows a single amplifier 802 coupled to drivers 804 and 806 through a speaker input terminal 808, which again can be a back-panel plug, screw, or other similar wiring interface to connect the amplifier cables to the speaker. The drivers can comprise a low or mid frequency driver 804, such as a woofer or mid-range driver, and a high frequency driver 806, such as a tweeter or hi-mid driver. Inside the speaker, wires 801 send the amplified audio signals to the drivers 804 and 806. The audio signals are routed through routing card 810, which can be oriented in the speaker in one of two ways. For the embodiment of FIG. 8, the routing card 810 is routed to allow a single amplifier 802 connected to terminal 808 to drive both drivers 804 and 806 in parallel through a crossover circuit 812. This is a passive crossover mode for the two-way speaker in which the full-band audio signals from the amplifier are separated into appropriate sub-bands by the crossover 812 to transmission to the appropriate driver, i.e., high frequency audio signals to the tweeter 806 and mid/low frequency audio signals to the woofer 804. This is a passive mode for the two-way speaker, and for the example of FIG. 8, the routing card 810 is shown in an orientation of connectors JP1 above connectors JP2.

When the routing card 810 is rotated (flipped) and inserted into the speaker in the opposite orientation, a different operating mode of speaker system 800 is selected, such as bi-amp versus passive mode. FIG. 9 illustrates an electrical schematic for a two-way speaker in a bi-amp active mode, under some embodiments. As shown in FIG. 9, diagram 900 shows two amplifiers 802 and 803 coupled to the drivers 804 and 806 through the speaker input terminal 808. The audio signals are routed through routing card 810, which is inserted in an opposite orientation to that of diagram 800. For the embodiment of FIG. 9, the routing card 810 is routed to allow each amplifier 802 and 803 connected to terminal 808 to separately drive a different respective driver 804 and 806 without using crossover 812. For this configuration, the appropriate audio signal frequency bands are sent by each amplifier separately to the appropriate driver, so no internal speaker crossover function is required. For the example of FIG. 9, the routing card 810 is shown in an orientation of connectors JP2 above connectors JP1.

As stated previously with respect to FIGS. 6 and 7, for FIGS. 8 and 9, it can likewise be seen that the physical wiring between the speaker input terminal 808, the routing card receptacle, and the drivers are the same for either configuration of FIG. 8 or 9. The orientation of the rotatable routing card 810 dictates the actual connections of the wiring between the amp or amps connected to the terminal 808 and the drivers 804 and 806.

In an embodiment, the routing card in any use case (e.g., FIG. 1A or FIG. 1B) is a PCB with specific wiring connections between two sets of terminals arrayed along different (e.g., opposite) sides of the card. Thus, as shown in FIG. 4, the routing card 202 with connectors 203 is inserted into corresponding mating terminals 406 of the internal interface card 404 in receptacle 402 of the speaker. The routing card is thus simply a symmetrical copper wiring arrangement, and the different operating modes are determined by the interface card 404 configuration and the orientation of the routing card 202 when they are connected.

Figure 10A:
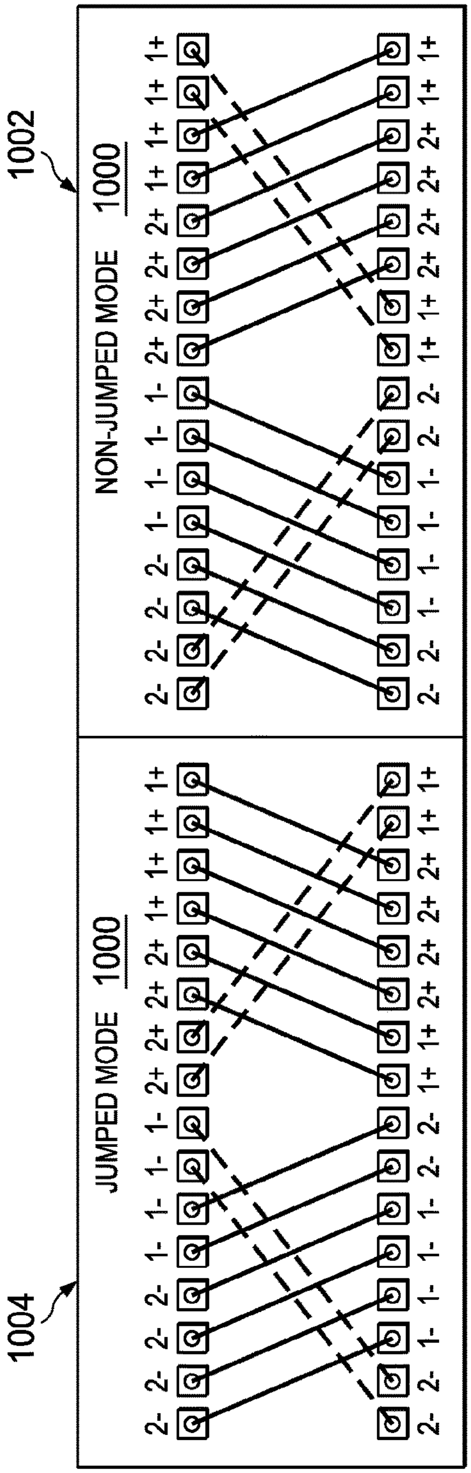
FIG. 10A illustrates a detailed wiring diagram of the routing card for the jumped and non-jumped dual woofer modes of FIGS. 6 and 7, under embodiments.

FIG. 10A illustrates a detailed wiring diagram of the routing card for the jumped and non-jumped dual woofer modes of FIGS. 6 and 7, under embodiments. As shown in FIG. 10A, the routing card 1000 has a series of connectors on arrayed in rows on either side of the PCB. In this example, the connectors are labeled +1, −1, +2, −2 and so on to correspond to the internal interface card connections. The labeled terminal assignments for these connectors are symmetrical along a particular axis (e.g., vertical axis) of the card. Different static traces are provided between the two rows of connectors and rotating and re-inserting the card about the symmetrical axis chooses the opposite set of connections between the two terminals, thus yielding two different modes of operation when the routing card is connected to the interface card.

Table 2 illustrates an example function of each connector of the routing card 1000, under some embodiments.

TABLE 2

| PIN | FUNCTION |
|---|---|
| 1+ | Input Pin 1 Positive (always connected to Woofer 1 positive terminal) |
| 1− | Input Pin 1 Negative (always connected to Woofer 1 negative terminal) |
| 2+ | Input Pin 2 Negative (always connected to Woofer 2 positive terminal) |
| 2− | Input Pin 2 Negative (always connected to Woofer 2 negative terminal) |

When the routing card is mated with the internal connector card with a rotation angle such that it is in the non-jumped mode 1002, no signals are cross connected, 1+ is connected to 1+, 2+ to 2+, 1− to 1−, and 2− to 2−. Since woofer 1 is always connected to 1+ and 1−, and woofer 2 is always connected to 2+ and 2−, each woofer can be independently driven with two separate audio amplifiers. When the routing card is mated with a rotation angle such that it is in the jumped mode (so called because the input pins are 'jumped' together) 1004, 1+ is jumped to 2+, 1− is jumped to 2−. Since woofer 1 is always connected to 1+ and 1−, and woofer 2 is always connected to 2+ and 2−, both woofers are now jumped together and a single audio amplifier can be used to drive the loudspeaker system. Thus, a simple rotation of the routing PCB card allows the user to externally set the electrical configuration of the internal speaker wiring.

Figure 10B:
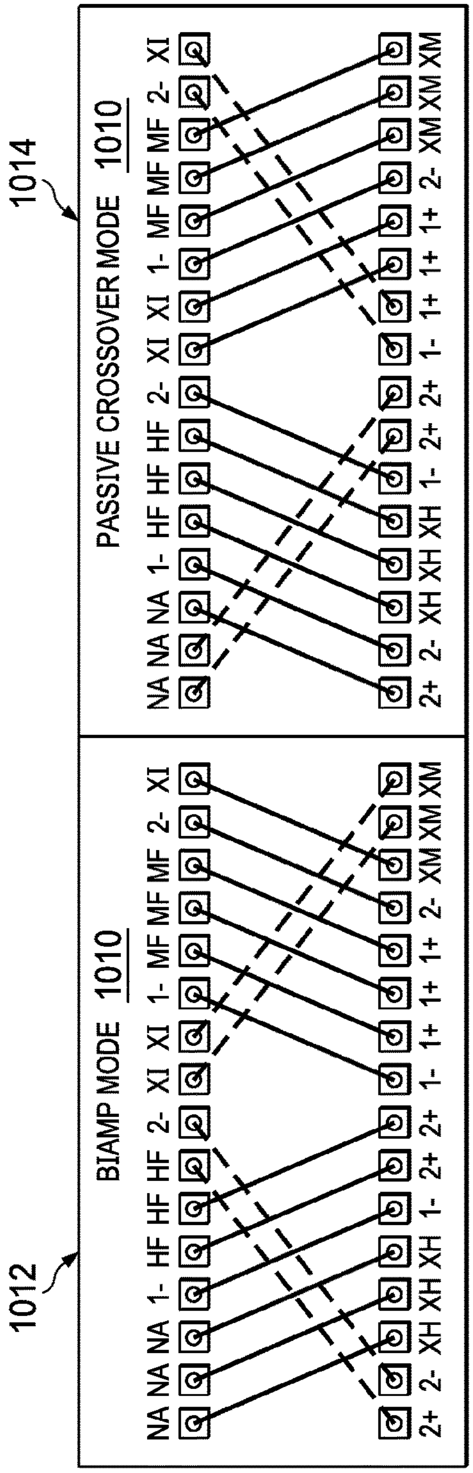
FIG. 10B illustrates a detailed wiring diagram of the routing card for the passive and active two-way speaker modes of FIGS. 8 and 9, under embodiments.

FIG. 10B illustrates a detailed wiring diagram of the routing card for the passive and bi-amp two-way speaker modes of FIGS. 8 and 9, under embodiments. As shown in FIG. 10B, the routing card 1010 has a series of connectors on arrayed in rows on either side of the PCB. In this example, the connectors are labeled XI, −2, MF, and so on as shown, to correspond to the internal interface card connections. As before, the labeled terminal assignments for these connectors are symmetrical along a particular axis (e.g., vertical axis) of the card. Different static traces are provided between the two rows of connectors and rotating and re-inserting the card about the symmetrical axis chooses the opposite set of connections between the two terminals, thus yielding two different modes of operation when the routing card is connected to the interface card.

Table 3 illustrates an example function of each connector of the routing card 1010, under some embodiments.

TABLE 3

| PIN | FUNCTION |
|---|---|
| 1+ | Input Pin 1 Positive |
| 1− | Input Pin 1 Negative |
| 2+ | Input Pin 2 Negative |
| 2− | Input Pin 2 Negative |
| XM | Crossover Midrange Frequency Output |
| XH | Crossover High Frequency Output |
| XI | Crossover Input Positive |
| MF | Midrange Driver Positive |
| HF | High Frequency Driver Positive |

When the routing card is mated with a rotation angle such that it is in the passive crossover mode 1014, the following signals are connected:

XM to MF: Crossover Midrange Output connected to the Midrange Driver Positive Terminal.

XH to HF: Crossover High Frequency Output connected to the High Frequency Driver Positive Terminal.

1+ to XI: Input Pin 1 Positive connected to Crossover Input Positive Terminal.

1− to 2−: Input Pin 1 Negative connected to Input Pin 2 Negative.

When the routing card is mated with a rotation angle such that it is in the bi-amp mode 1012, the following signals are connected:

XM to XI: Crossover Midrange Output connected to the Crossover Input Positive (no function here).

1+ to MF: Input Pin 1 Positive connected to Midrange Driver Positive Terminal.

2+ to HF: Input Pin 2 Positive connected to High Frequency Driver Positive Terminal.

FIGS. 10A and 10B are provided for purposes of example, and any other configuration of a routing card may be used depending on the system configuration and requirements, such as the use case of the speaker, possible operating modes, amplifier/driver configuration, and audio playback requirements.

Embodiments of the configurable speaker system essentially uses two PCB circuits. One permanently mounted PCB 404 within the speaker as the internal connector that interconnects: (a) the main input connector into the speaker, (b) the crossover input/output signals, (c) the speaker drive signals, and (d) the receptacle for the routing card; and one external/rotatable PCB 202 that is outside the primary loudspeaker enclosure but provides at least two different signal routing options (modes) when plugged into the permanent internal PCB at various angles (0 or 180). The orientation of the routing card PCB results in changing the signal routing within the speaker, and other than the rotation of the routing PCB traces, all of the other wiring and PCB traces and circuitry are fixed.

Figure 11:
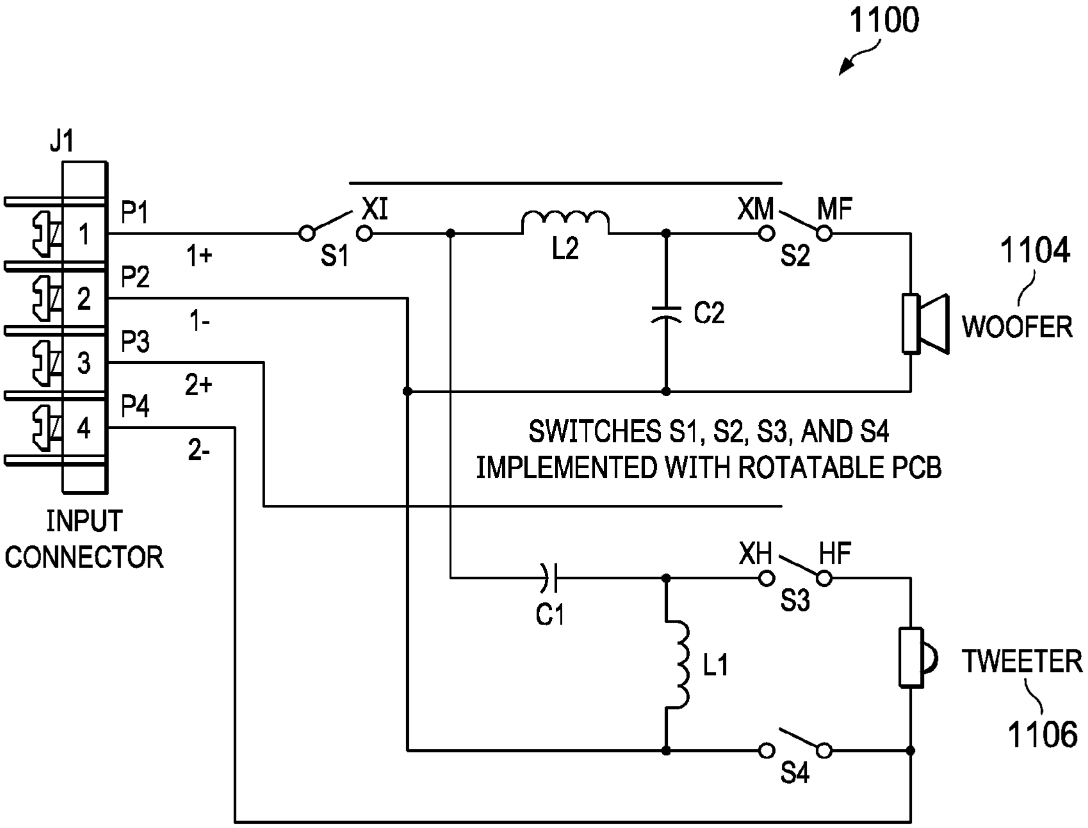
FIG. 11 is a circuit diagram illustrating the equivalent switching function of the routing card to change the mode of operation in a two-way speaker between passive and bi-amp modes, under some embodiments.

The use of a rotatable routing card with the internal connector PCB conveniently and effectively switches the configuration of a speaker system between two modes of operation with a simple flip of the card. As such it replaces actual switches and relays through the configurable interface between the routing card connectors and the internal connector card terminal. FIG. 11 is a circuit diagram illustrating the equivalent switching function of the routing card to change the mode of operation in a two-way speaker between passive and bi-amp modes, under some embodiments. As shown in diagram 1100, the card acts to set four switches denoted S1, S2, S3, and S4 between a connection terminal J1 and a set of speakers, woofer/midrange 1104 and tweeter 1106. Diagram 1100 shows how switches S1-S4 are thrown in one of two-states by rotating the routing card. It also shows how the use of a routing card simplifies the internal circuitry of the speaker by eliminating actual physical switches or other connection methods, such as patch cables, and so on.

Figure 12:
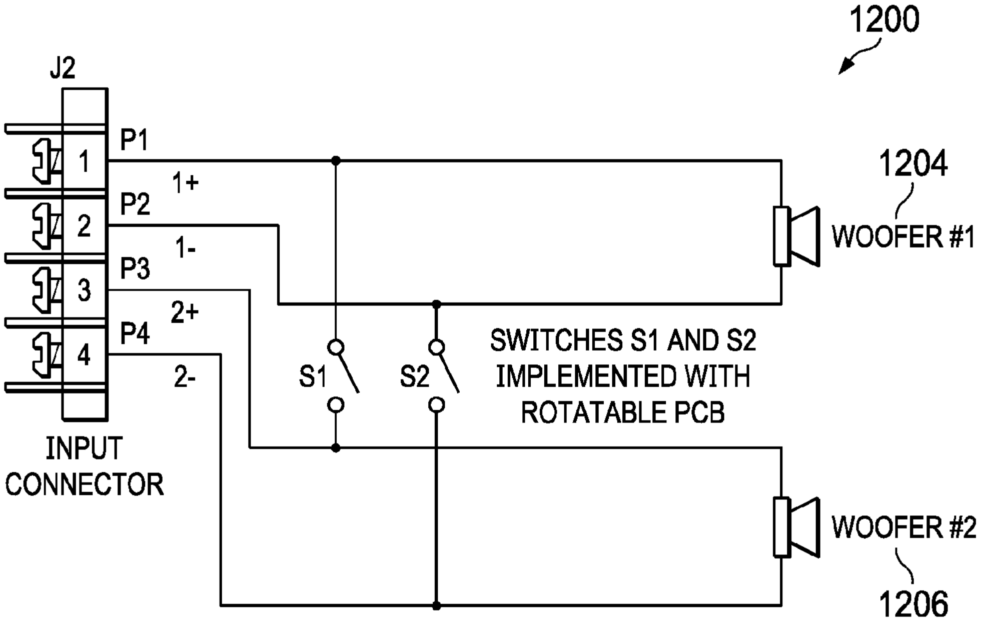
FIG. 12 is a circuit diagram illustrating the equivalent switching function of the routing card to change the mode of operation in a dual woofer speaker between jumped and non-jumped mode, under some embodiments.

FIG. 12 is a circuit diagram illustrating the equivalent switching function of the routing card to change the mode of operation in a dual woofer speaker between jumped and non-jumped mode, under some embodiments. As shown in diagram 1200, the card acts as a set of two switches denoted S1 and S2 between a connection terminal J2 and parallel or independently driven woofers 1204 and 1206. Diagram 1200 shows how switches S1 and S2 are thrown in one of two modes via rotating the routing card. Again this shows the replacement of complex switching circuitry with a simple PCB based routing card.

Although embodiments have been described with respect to certain operating modes, such as single-amp versus multi-amp, and crossover in or out mode, embodiments are not so limited and any other selectable use case with different operating modes may be used depending on system requirements and transducer/audio processing circuitry configuration. Furthermore, although embodiments are described with respect to separate assemblies for the routing PCB card, and internal mating PCB, embodiments may also include integrated switchable circuits or incorporating the input connector, the routing PCB card, and the internal mating PCB into a single subassembly.

Although embodiments are discussed with respect to mating the routing card in the speaker two distinct rotational angles (e.g., 0 and 180 degrees, as shown in FIG. 3), other orientation angles are also possible. For example, a four-way configuration scheme may be provided in which the speaker card is designed to be four-way symmetric as opposed to two-way symmetric. In this embodiment, the routing card may be symmetric about the horizontal (x) axis and vertical (y) axis, such that it can inserted in one of four ways at rotational angles of 0, 90, 180, and 270 degrees. One setting may select one out of four modes of operation, such as bi-amp only, bi-amp and crossover, crossover only, and no bi-amp or crossover.

Furthermore, although embodiments have been described with respect to speakers with two woofers or two-way speakers with a low/mid driver and a tweeter, embodiments are not so limited. The speaker may have a single driver with internal or associated audio processing circuitry, and the routing card may be used to switch the audio processing functions in or out with the speaker, for example selecting direct drive or filtered drive for a speaker where one mode route the drive signal through a single internal filter. Likewise, the speaker may include multiple drivers that may be grouped into one or more driver arrays that may be connected in different ways based on the routing card orientation. Thus, any practical combination of drivers and internal processing circuitry may be used for selection using the routing card system and method described herein.

Unless the context clearly requires otherwise, throughout the description and the claims, the words "comprise," "comprising," and the like are to be construed in an inclusive sense as opposed to an exclusive or exhaustive sense. Words using the singular or plural number also include the plural or singular number respectively. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not so limited. The description is intended to cover various modifications and similar arrangements as would be apparent to those skilled in the art. Therefore, the scope of the appended claims should be accorded the broadest interpretation so as to encompass all such modifications and similar arrangements.

Various aspects of the present invention may be appreciated from the following enumerated example embodiments (EEEs):

EEE1. A user configurable speaker comprising:
- one or more drivers mounted in enclosure forming an at least partially enclosed volume;
- an audio input interface configured to be coupled to an audio source through one or more amplifiers; and
- a connector interface configured to receive a routing card, wherein the routing card is insertable in a first orientation to connect the audio input interface to the audio source in a first operating mode with respect to driver selection and connection to the one or more amplifiers, and a second orientation to connect the audio input interface to the audio source in a second operating mode with respect to driver selection and connection to the one or more amplifiers.

EEE2. The speaker of EEE 1 wherein the routing card comprises a printed circuit board (PCB) having a connector side comprising a set of connectors for connection to a corresponding connector set on the connector interface.

EEE3. The speaker of EEE 2 wherein the routing card comprises a set of conductive traces, and further wherein a first direction of the traces couples the set of connectors together in a first routing scheme for the first operating mode, and a second direction of the traces couples the set of connectors together in a second routing scheme for the second operating mode.

EEE4. The speaker of EEE 3 wherein the set of connectors comprises two rows of connectors disposed proximate opposite edges of the connector side and arranged opposite a central axis of symmetry of the PCB, and wherein the first direction is selected by connecting the routing card to the connector interface in a first rotational orientation relative to the central axis, and the second direction is selected by connecting the routing card to the connector interface in a second rotational orientation relative to the central axis.

EEE5. The speaker of EEE 4 wherein the speaker further comprises a receptacle formed into a surface of the enclosure and providing access to the connector interface for coupling the connector side of the routing card to the corresponding connector set on the connector interface.

EEE6. The speaker of EEE 5 wherein the receptacle is configured to be of a size suitable to allow a user to reach in by hand and grasp the routing card for insertion and removal to and from the corresponding connector set on the connector interface.

EEE7. The speaker of any of EEEs 1-6 wherein the connector interface comprises two sets of connections between the audio interface, the one or more drivers, and one or more audio processing circuits of the speaker, and wherein insertion of the routing card in the first orientation selects a first set of connections for audio signals among the audio interface, the drivers, and the audio processing circuits, and insertion of the routing card in the second orientation selects a second set of connections for the audio signals among the audio interface, the drivers, and the audio processing circuits.

EEE8. The speaker of any of EEEs 1-7 wherein the one or more drivers comprises two woofers and the audio input interface is coupled to at least two amplifiers, and wherein the first mode comprises each of the two woofers driven by a single amplifier, and the second mode comprises each of the two woofers driven independently by a respective amplifier.

EEE9. The speaker of any of EEEs 1-8 wherein the one or more drivers comprises a woofer and a tweeter, and the audio input interface is coupled to at least two amplifiers, and wherein the first mode comprises the woofer and tweeter both driven by a single amplifier with a crossover circuit directing appropriate audio frequency signals to the woofer and to the tweeter, and the second mode comprises each of the woofer and tweeter driven independently by a respective amplifier without the crossover circuit.

EEE10. A speaker configurator for routing audio signals in a speaker, the speaker comprising one or more drivers, the speaker configurator comprising:
- a printed circuit board (PCB) having a set of traces laid out such that a first orientation of the PCB is configured to cause a speaker to operate in a first mode by routing audio signals within the speaker to a first routing between the drivers and one or more amplifiers external to the speaker, and a second orientation of the PCB is configured to cause the speaker to operate in a second mode by routing the audio signals to a second routing between the drivers and the one or more amplifiers; and
- a connector interface configured to connect to the PCB in the first orientation to connect the drivers to the one or more amplifiers in the first mode, and to connect to the PCB in the second orientation to connect the drivers to the one or more amplifiers in the second mode.

EEE11. The speaker configurator of EEE 10 wherein the PCB has a connector side, the connector side comprising a set of connectors for connection to a corresponding connector set on the connector interface.

EEE12. The speaker configurator of EEE 11 wherein the PCB comprises a set of conductive traces, and further wherein a first direction of the traces couples the set of connectors together in a first routing scheme for the first operating mode, and a second direction of the traces couples the set of connectors together in a second routing scheme for the second operating mode.

EEE13. The speaker configurator of EEE 12 wherein the set of connectors comprises two rows of connectors disposed proximate opposite edges of the connector side and arranged opposite a central axis of symmetry of the PCB, and wherein the first direction is selected by connecting the routing card to the connector interface in a first rotational orientation relative to the central axis, and the second direction is selected by connecting the routing card to the connector interface in a second rotational orientation relative to the central axis.

EEE14. The speaker configurator of any of EEEs 10-13 wherein the one or more drivers comprise two woofers, and the first mode comprises each of the two woofers being driven by a single amplifier, and the second mode comprises each of the two woofers being driven by its own respective amplifier.

EEE15. The speaker configurator of any of EEEs 10-14 wherein the one or more drivers comprise a woofer and a tweeter, the speaker further comprising an internal passive crossover circuit, and wherein the first mode comprises a passive mode in which the woofer and tweeter are both driven by a single amplifier and the passive crossover passes high frequency audio signals to the tweeter and low frequency audio signals to the woofer, and the second mode comprises a bi-amp mode in which the woofer and tweeter are each driven by their own respective amplifier and the passive crossover circuit is not used.

EEE16. A method of changing an operating mode of a configurable speaker having one or more drivers, the method comprising:

providing a printed circuit board (PCB) having a set of traces laid out such that a first orientation of the PCB is configured to cause a speaker to operate in a first mode by routing audio signals within the speaker to a first routing between the drivers and one or more amplifiers external to the speaker, and a second orientation of the PCB is configured to cause the speaker to operate in a second mode by routing the audio signals to a second routing between the drivers and the one or more amplifiers; and providing a connector interface configured to connect to the PCB in the first orientation to connect the drivers to the one or more amplifiers in the first mode, and to connect to the PCB in the second orientation to connect the drivers to the one or more amplifiers in the second mode.

EEE17. The method of EEE 16 wherein the PCB comprises a set of conductive traces, and further wherein a first direction of the traces couples the set of connectors together in a first routing scheme for the first operating mode, and a second direction of the traces couples the set of connectors together in a second routing scheme for the second operating mode.

EEE18. The method of EEE 17 wherein the set of connectors comprises two rows of connectors disposed proximate opposite edges of the connector side and arranged opposite a central axis of symmetry of the PCB, and wherein the first direction is selected by connecting the routing card to the connector interface in a first rotational orientation relative to the central axis, and the second direction is selected by connecting the routing card to the connector interface in a second rotational orientation relative to the central axis.

EEE19. The method of any of EEEs 16-18 wherein the one or more drivers comprise two woofers, and the first mode comprises each of the two woofers being driven by a single amplifier, and the second mode comprises each of the two woofers being driven by its own respective amplifier.

EEE20. The method of any of EEEs 16-19 wherein the one or more drivers comprise a woofer and a tweeter, the speaker further comprising an internal passive crossover circuit, and wherein the first mode comprises a passive mode in which the woofer and tweeter are both driven by a single amplifier and the passive crossover passes high frequency audio signals to the tweeter and low frequency audio signals to the woofer, and the second mode comprises a bi-amp mode in which the woofer and tweeter are each driven by their own respective amplifier and the passive crossover circuit is not used.

EEE21. The speaker of any of EEE 1 or EEE 5-10 wherein the routing card comprises a printed circuit board (PCB) having a connector side comprising a set of connectors for connection to a corresponding connector set on the connector interface.

EEE22. The speaker of EEE 21 wherein the routing card comprises a set of conductive traces coupling the set of connectors of the connector side of the PCB together such that, when the PCB is inserted with the first orientation in the connector interface, the traces couple the set of connectors on the connector interface together in a first routing scheme thereby causing the speaker to operate in the first operating mode, and such that, when the PCB is inserted with the second orientation in the connector interface, the traces couple the set of connectors on the connector interface together in a second routing scheme thereby causing the speaker to operate in the second operating mode.

EEE23. The speaker of EEE 22 wherein the set of connectors of the connector side of the PCB comprises first and second rows of connectors and the corresponding set of connectors on the connector interface comprises first and second rows of connectors, and wherein, when the PCB is inserted with the first orientation in the connector interface, the first row of connectors of the connector side of the PCB are coupled to the first row of connectors on the connector interface and the second row of connectors of the connector side of the PCB are coupled to the second row of connectors on the connector interface, and when the PCB is inserted with the second orientation in the connector interface, the first row of connectors of the connector side of the PCB are coupled to the second row of connectors on the connector interface and the second row of connectors of the connector side of the PCB are coupled to the first row of connectors on the connector interface.

EEE24. The speaker of EEE 23 wherein the first and second rows of connectors of the PCB are disposed proximate to opposite edges of the connector side and arranged opposite a central axis of symmetry of the PCB.

EEE25. The speaker configurator of any of EEE 10 or EEE 14-15 wherein the PCB has a connector side, the connector side comprising a set of connectors for connection to a corresponding set of connectors on the connector interface, and further wherein the set of conductive traces of the PCB couple the set of connectors of the connector side of the PCB together such that, when the PCB is connected to the connector interface in the first orientation, the traces couple the set of connectors on the connector interface together in a first routing scheme to cause the speaker to operate in the first operating mode, and such that, when the PCB is connected to the connector interface in the second orientation, the traces couple the set of connectors on the connector interface together in a second routing scheme to cause the speaker to operate in the second operating mode.

EEE26. The speaker configurator of EEE 25 wherein the set of connectors of the connector side of the PCB comprises first and second rows of connectors and the corresponding set of connectors on the connector interface comprises first and second rows of connectors, and wherein, when the PCB is connected to the connector interface in the first orientation, the first row of connectors of the connector side of the PCB are coupled to the first row of connectors on the connector interface and the second row of connectors of the connector side of the PCB are coupled to the second row of connectors on the connector interface, and when the PCB is connected to the connector interface in the second orientation, the first row of connectors of the connector side of the PCB are coupled to the second row of connectors on the connector interface and the second row of connectors of the connector side of the PCB are coupled to the first row of connectors on the connector interface.

EEE27. The method of any one of EEE 16 or EEE 19-20 wherein the PCB has a connector side, the connector side comprising a set of connectors for connection to a corresponding set of connectors on the connector interface, and further wherein the set of conductive traces of the PCB couple the set of connectors of the connector side of the PCB together such that, when the PCB is connected to the connector interface in the first orientation the traces couple the set of connectors on the connector interface together in a first routing scheme to cause the speaker to operate in the first operating mode, and such that, when the PCB is connected to the connector interface in the second orientation, the traces couple the set of connectors on the connector interface together in a second routing scheme to cause the speaker to operate in the second operating mode.

EEE28. The method of EEE 27 wherein the set of connectors of the connector side of the PCB comprises first and second rows of connectors and the corresponding set of connectors on the connector interface comprises first and second rows of connectors, and wherein, when the PCB is connected to the connector interface in the first orientation, the first row of connectors of the connector side of the PCB are coupled to the first row of connectors on the connector interface and the second row of connectors of the connector side of the PCB are coupled to the second row of connectors on the connector interface, and when the PCB is connected to the connector interface in the second orientation, the first row of connectors of the connector side of the PCB are coupled to the second row of connectors on the connector interface and the second row of connectors of the connector side of the PCB are coupled to the first row of connectors on the connector interface.

EEE29. A user configurable speaker comprising:

one or more drivers mounted in an enclosure forming an at least partially enclosed volume;

an audio input interface configured to be coupled to an audio source through one or more amplifiers (e.g. to receive audio signals); and a connector interface configured to receive a routing card, wherein the routing card is insertable in a first orientation to cause the speaker to operate in a first operating mode by providing, through the connector interface and the routing card, a first routing of audio signals (e.g. received by the audio input interface) between the audio input interface and the one or more drivers, and a second orientation to cause the speaker to operate in a second operating mode by providing, through the connector interface and the routing card, a second routing of audio signals (e.g. received by the audio input interface) between the audio input interface and the one or more drivers.

EEE30. The speaker of EEE 29, wherein the connector interface is coupled between the one or more drivers and the audio input interface.

EEE31. The speaker of any of EEE 30-31 wherein the routing card comprises a printed circuit board (PCB) having a connector side comprising a set of connectors for connection to a corresponding connector set on the connector interface.

EEE32. The speaker of EEE 31 wherein the routing card comprises a set of conductive traces coupling the set of connectors of the connector side of the PCB together such that, when the PCB is inserted with the first orientation in the connector interface, the traces couple the set of connectors on the connector interface together in a first routing scheme thereby causing the speaker to operate in the first operating mode, and such that, when the PCB is inserted with the second orientation in the connector interface, the traces couple the set of connectors on the connector interface together in a second routing scheme thereby causing the speaker to operate in the second operating mode.

EEE33. The speaker of EEE 32 wherein the set of connectors of the connector side of the PCB comprises first and second rows of connectors and the corresponding set of connectors on the connector interface comprises first and second rows of connectors, and wherein, when the PCB is inserted with the first orientation in the connector interface, the first row of connectors of the connector side of the PCB are coupled to the first row of connectors on the connector interface and the second row of connectors of the connector side of the PCB are coupled to the second row of connectors on the connector interface, and when the PCB is inserted with the second orientation in the connector interface, the first row of connectors of the connector side of the PCB are coupled to the second row of connectors on the connector interface and the second row of connectors of the connector side of the PCB are coupled to the first row of connectors on the connector interface.

EEE34. The speaker of EEE 33 wherein the first and second rows of connectors of the PCB are disposed proximate to opposite edges of the connector side and arranged opposite a central axis of symmetry of the PCB.

EEE35. The speaker of any of EEE 1-9, EEE 21-24 or EEE 29-34 comprising the routing card removably inserted in the connection interface in the first orientation or the second orientation.

The invention claimed is:

1. A user configurable speaker comprising:

at least two drivers mounted in enclosure forming an at least partially enclosed volume;

an audio input interface configured to be coupled to an audio source through one or more amplifiers; and a connector interface configured to receive a routing card, wherein the routing card is insertable in a first orientation to connect the audio input interface to the audio source in a first operating mode with respect to driver selection and connection to the one or more amplifiers, and a second orientation to connect the audio input interface to the audio source in a second operating mode with respect to driver selection and connection to the one or more amplifiers, wherein the routing card comprises a printed circuit board (PCB) having a connector side comprising a set of connectors for connection to a corresponding set of connectors on the connector interface, wherein the routing card comprises a set of conductive traces coupling the set of connectors of the connector side of the PCB together such that, when the PCB is inserted with the first orientation in the connector interface, the traces couple the set of connectors on the connector interface together in a first routing scheme thereby causing the speaker to operate in the first operating mode, and such that, when the PCB is inserted with the second orientation in the connector interface, the traces couple the set of connectors on the connector interface together in a second routing scheme thereby causing the speaker to operate in the second operating mode, and wherein the set of connectors of the connector side of the PCB comprises first and second rows of connectors and the corresponding set of connectors on the connector interface comprises first and second rows of connectors, and wherein, when the PCB is inserted with the first orientation in the connector interface, the first row of connectors of the connector side of the PCB are coupled to the first row of connectors on the connector interface and the second row of connectors of the connector side of the PCB are coupled to the second row of connectors on the connector interface, and when the PCB is inserted with the second orientation in the connector interface, the first row of connectors of the connector side of the PCB are coupled to the second row of connectors on the connector interface and the second row of connectors of the connector side of the PCB are coupled to the first row of connectors on the connector interface.

2. The speaker of claim 1 wherein the first and second rows of connectors of the PCB are disposed proximate to opposite edges of the connector side and arranged opposite a central axis of symmetry of the PCB.

3. The speaker of claim 1 wherein the speaker further comprises a receptacle formed into a surface of the enclosure and providing access to the connector interface for coupling the connector side of the routing card to the corresponding set of connectors on the connector interface, and further wherein the receptacle is configured to be of a size suitable to allow a user to reach in by hand and grasp the routing card for insertion and removal to and from the corresponding set of connectors on the connector interface.

4. The speaker of claim 1 wherein the connector interface comprises two sets of connections between the audio input interface, the drivers, and one or more audio processing circuits of the speaker, and wherein insertion of the routing card in the first orientation selects a first set of connections for audio signals among the audio input interface, the drivers, and the audio processing circuits, and insertion of the routing card in the second orientation selects a second set of connections for the audio signals among the audio input interface, the drivers, and the audio processing circuits.

5. The speaker of claim 1 wherein the drivers comprises two woofers and the audio input interface is configured to be coupled to at least two amplifiers, and wherein the first mode comprises each of the two woofers driven by a single amplifier, and the second mode comprises each of the two woofers driven independently by a respective amplifier.

6. The speaker of claim 1 wherein the drivers comprises a woofer and a tweeter, and the audio input interface is configured to be coupled to at least two amplifiers, and wherein the first mode comprises the woofer and tweeter both driven by a single amplifier with a crossover circuit directing appropriate audio frequency signals to the woofer and to the tweeter, and the second mode comprises each of the woofer and tweeter driven independently by a respective amplifier without the crossover circuit.

7. The speaker of claim 1 comprising the routing card removably inserted in the connector interface in the first orientation or the second orientation.

8. A method of changing an operating mode of a configurable speaker having at least two drivers, an audio input interface configured to be coupled to an audio source through one or more amplifiers; and a connector interface configured to receive a routing card, wherein the routing card comprises a printed circuit board (PCB) having a connector side comprising a set of connectors for connection to a corresponding set of connectors on the connector interface, the method comprising:

inserting the PCB in the connector interface in a first orientation or a second orientation, the PCB having a set of conductive traces laid out such that inserting the PCB in the connector interface in the first orientation causes the speaker to operate in a first operating mode by routing audio signals within the speaker to a first routing between the drivers and the one or more amplifiers, and such that inserting the PCB in the connector interface in the second orientation causes the speaker to operate in a second operating mode by routing the audio signals to a second routing between the drivers and the one or more amplifiers, wherein the PCB has a connector side, the connector side comprising a set of connectors for connection to a corresponding set of connectors on the connector interface, and further wherein the set of conductive traces of the PCB couple the set of connectors of the connector side of the PCB together such that, when the PCB is connected to the connector interface in the first orientation the traces couple the set of connectors on the connector interface together in a first routing scheme to cause the speaker to operate in the first operating mode, and such that, when the PCB is connected to the connector interface in the second orientation, the traces couple the set of connectors on the connector interface together in a second routing scheme to cause the speaker to operate in the second operating mode, and wherein the set of connectors of the connector side of the PCB comprises first and second rows of connectors and the corresponding set of connectors on the connector interface comprises first and second rows of connectors, and wherein, when the PCB is connected to the connector interface in the first orientation, the first row of connectors of the connector side of the PCB are coupled to the first row of connectors on the connector interface and the second row of connectors of the connector side of the PCB are coupled to the second row of connectors on the connector interface, and when the PCB is connected to the connector interface in the second orientation, the first row of connectors of the connector side of the PCB are coupled to the second row of connectors on the connector interface and the second row of connectors of the connector side of the PCB are coupled to the first row of connectors on the connector interface.

9. The speaker of claim 1 wherein the connector interface is mounted in the enclosure forming the at least partially enclosed volume.

10. The speaker of claim 1 wherein the connector interface is configured to receive the routing card in one of only two orientations.

11. The speaker of claim 1 wherein the second orientation is a one-hundred-and-eighty-degree rotation relative to the first orientation.

* * * * *